US009135272B2

(12) United States Patent
Syeda-Mahmood et al.

(10) Patent No.: US 9,135,272 B2
(45) Date of Patent: Sep. 15, 2015

(54) FINDING SIMILAR CORONARY ANGIOGRAMS IN A DATABASE

(71) Applicant: International Business Machines Corporation, Armonk, NY (US)

(72) Inventors: Tanveer F. Syeda-Mahmood, Cupertino, CA (US); Fei Wang, San Jose, CA (US); David J. Beymer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 14/045,869

(22) Filed: Oct. 4, 2013

(65) Prior Publication Data

US 2015/0098638 A1  Apr. 9, 2015

(51) Int. Cl.
*G06K 9/00* (2006.01)
*G06F 17/30* (2006.01)
(Continued)

(52) U.S. Cl.
CPC ........ *G06F 17/30256* (2013.01); *G06K 9/4671* (2013.01); *G06K 9/6215* (2013.01)

(58) Field of Classification Search
CPC ... G06K 9/3233; G06K 9/342; G06K 9/6267; G06K 2209/051; H04N 5/3205; G06T 5/00; G06T 5/50; G06T 7/0012; G06T 7/0014; G06T 7/0081; G06T 7/0083; G06T 7/0089; G06T 7/20; G06T 7/602; G06T 7/604; G06T 2207/10072; G06T 2207/30016; G06F 19/321; G06F 19/322; G06F 19/3406; G06F 19/345; A61B 5/02007; A61B 5/7264; A61B 6/027; A61B 6/12; A61B 6/4441; A61B 6/469; A61B 6/481; A61B 6/503; A61B 6/504; A61B 6/507; A61B 6/5235; A61B 6/5247; A61B 6/527; A61B 6/541; A61B 8/5276; G09B 23/28; G01R 33/281; G01R 33/54; G01R 35/5601; G01R 33/5608; G01R 33/563; G01R 33/5635
See application file for complete search history.

(56) References Cited

U.S. PATENT DOCUMENTS 7,639,847 B2 * 12/2009 Middleton et al. ............ 382/128
(Continued)

FOREIGN PATENT DOCUMENTS

WO  03101300 A2  12/2003

OTHER PUBLICATIONS

Tomasello et al., "Quantitative Coronary Angiography in the Interventional Cardiology" Advances in the Diagnosis of Coronary Atherosclerosis, Prof. Suna Kirac (Ed.), ISBN: 978-953-307-286-9, InTech, available from: www.intechopen.com/books/advances-in-the-diagnosis-of-coronary-atherosclerosis/quantitative-coronary-angiography-in-the-interventional-cardiology (2011), 19 pags.

*Primary Examiner* — Jose Couso
(74) *Attorney, Agent, or Firm* — Cantor Colburn LLP; Libby Toub (57) ABSTRACT

Embodiments relate to finding similar coronary angiograms in a database of coronary angiograms. An aspect includes receiving angiography data for a coronary artery, processing the angiography data to identify one or more semantic features of the coronary artery, and identifying one or more nearest coronary angiograms for each of the one or more semantic features from the database of coronary angiograms. The method also includes receiving a disease attribute associated with each of the one or more nearest coronary angiograms.

17 Claims, 4 Drawing Sheets (51) Int. Cl.
*G06K 9/46* (2006.01)
*G06K 9/62* (2006.01)

(56) References Cited

U.S. PATENT DOCUMENTS 7,697,974 B2 * 4/2010 Jenkins et al. ............... 600/428
8,064,663 B2 * 11/2011 Van Hoe et al. ............. 382/128
2007/0073142 A1 * 3/2007 Eck et al. ..................... 600/413
2009/0116715 A1 5/2009 Bredno et al.
2010/0014740 A1 1/2010 Movassaghi et al.
2010/0119131 A1 * 5/2010 Gebow ......................... 382/128
2013/0085774 A1 4/2013 Chen et al.

* cited by examiner

FINDING SIMILAR CORONARY ANGIOGRAMS IN A DATABASE

BACKGROUND

Embodiments of the invention relate generally to automated angiogram analysis, and more specifically, to finding similar coronary angiograms in a database.

Cardiovascular disease (CVD) results in more death and disability in both males and females in all western societies than any other disease category, accounting for one third of all deaths in the United States in 2007. Half of these deaths are due to coronary artery disease (CAD), which is the process of atherosclerotic narrowing of coronary arteries which are arteries that supply blood and oxygen to the heart muscle. Any occlusion of these arteries can impact heart function leading to effort intolerance with exertion provoked chest symptoms, heart attack, permanent impairment of heart muscle function, and sudden death.

The "gold standard" diagnostic test for CAD is the coronary angiogram. A coronary angiogram involves placing plastic catheters into the arterial system and injecting iodinated contrast solution into the coronary blood flow, to obtain a silhouette of the coronary arterial wall. The angiographic images are typically recorded at 15 or 30 frames a second, providing a motion picture of the flowing blood and contrast mixture to permit the identification of segmental coronary narrowing or blockage attributable to atherosclerotic plaque accumulation along the interior wall of the artery.

Interpretation of coronary angiograms is nearly always performed by visual estimation of the severity of narrowing in the diseased coronary artery, stated in percent of diameter lost in projections that display the narrowing at its worst. Because of the curvilinear cylindrical structure of an artery and the irregular and often eccentric remaining lumen through the diseased segment, several viewpoints are inspected in the effort to estimate the percentage of narrowing.

It is well-known that clinicians look for characteristic visual features during assessment taking into account the overall disease burden, the complexity of individual lesions (bifurcation or not),and placing more weight on proximal stenoses of the coronary arteries. Such semantic features often resolve to visual attributes such as lumen variation across an artery indicating non-homogenous opacification caused by the mixing up of dye and calcium deposits. Even though there are quantitative assessment scores such as the syntax score, they require manual input of angiographic information. In many cases, clinicians still characterize the disease by 'eyeballing' on salient visual features such as the relative thickness of arteries, the distance of the junctions from the root, the number of trifurcations, etc.

BRIEF SUMMARY

Embodiments include a method, system, and computer program product for finding similar coronary angiograms in a database of coronary angiograms. The method includes receiving angiography data for a coronary artery, processing the angiography data to identify one or more semantic features of the coronary artery, and identifying one or more nearest coronary angiograms for each of the one or more semantic features from the database of coronary angiograms. The method also includes receiving a disease attribute associated with each of the one or more nearest coronary angiograms.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to methods, systems and computer program products for finding similar coronary angiograms in a database. In exemplary embodiments, a coronary angiogram is performed on a coronary artery of a patient and the resulting images are processed to identify semantic features of the coronary artery. These semantic features are then quantified and represented by feature vectors, which are compared to feature vectors for previously processed angiogram images to find similar angiogram images. After similar angiogram images are identified, disease attributes associated with the similar angiogram images may be analyzed to create one or more possible disease attributes for the coronary artery.

Figure 1:
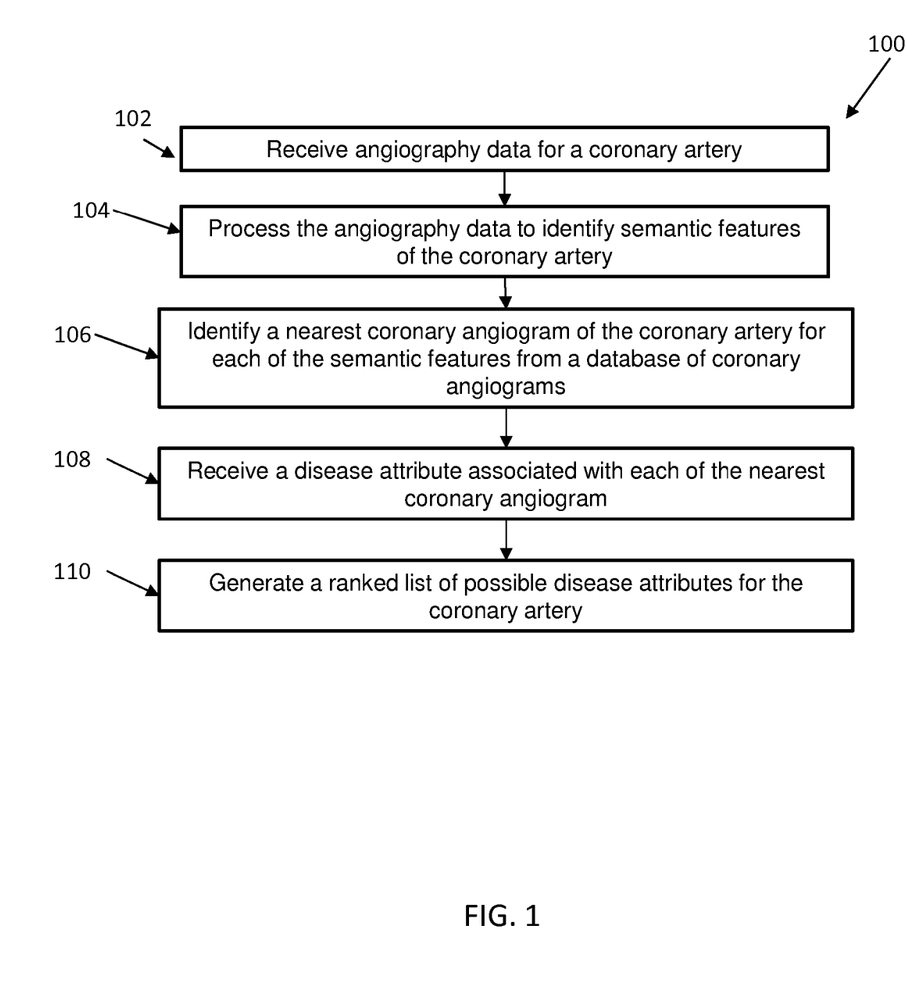
FIG. 1 depicts a process flow for finding similar coronary angiograms in a database in accordance with an embodiment.

Referring now to FIG. 1, a process flow of a method 100 for finding similar coronary angiograms in a database in accordance with an embodiment is illustrated. In exemplary embodiments, similar coronary angiograms are coronary angiograms which have common salient visual features such as the relative thickness of arteries, the distance of the junctions from the root, the number of trifurcations, etc. As illustrated at block 102, the method 100 begins by receiving angiography data for a coronary artery. In exemplary embodiments, the angiography data for a coronary artery includes multiple video sequences, referred to as runs. Each run depicts a coronary artery system of a patient from multiple viewpoints. Next, as shown at block 104, the method 100 includes processing the angiography data to identify semantic features of the coronary artery. The method 100 also includes identifying a nearest coronary angiogram of the coronary artery for each of the semantic features from a database of coronary angiograms, as shown at block 106. In exemplary embodiments, the nearest coronary angiogram is identified by finding a coronary angiogram that has a feature vector that is closest to a feature vector created based on the angiography data. Next, as shown at block 108, the method 100 includes receiving a disease attribute associated with each of the nearest coronary angiogram. As illustrated at block 110, the method 100 generating a ranked list of possible disease attributes for the coronary artery.

Figure 2:
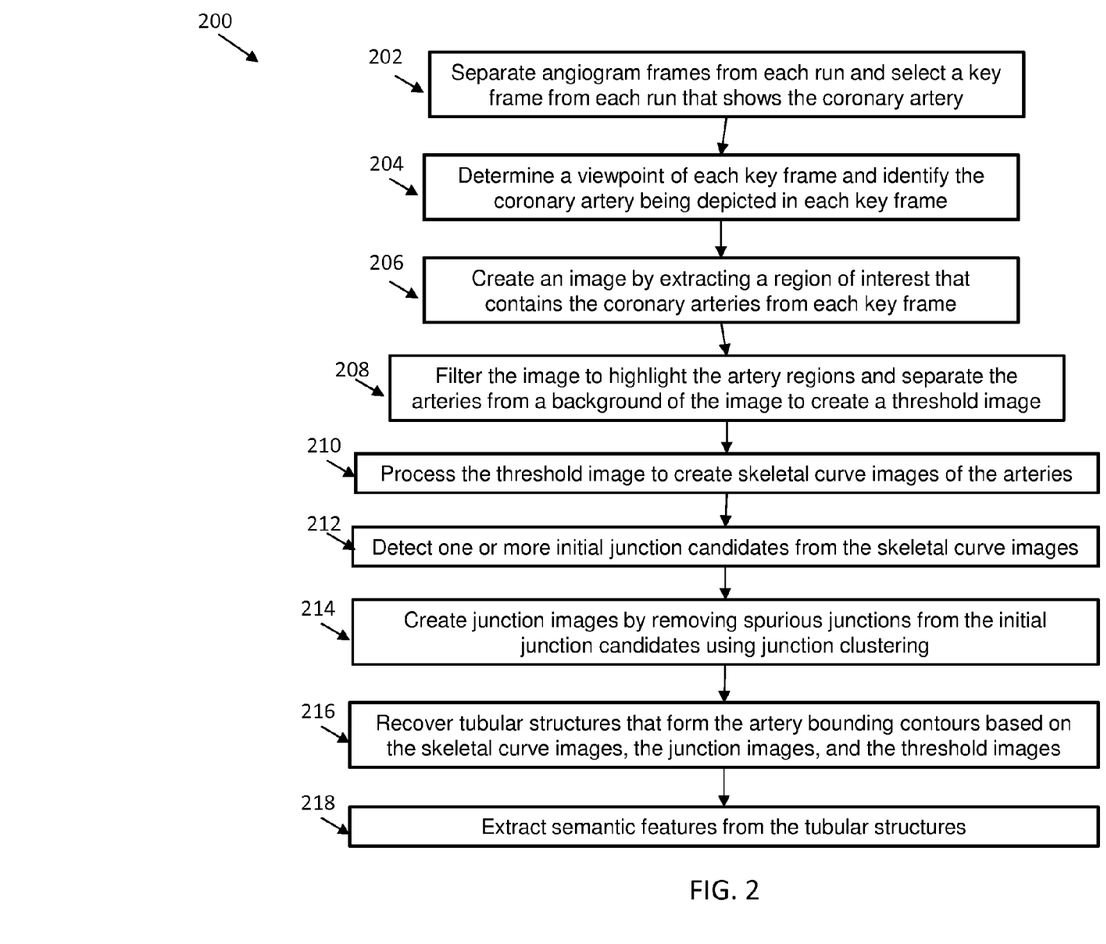
FIG. 2 depicts a process flow for processing angiography data to identify semantic features of the coronary artery in accordance with an embodiment.

Referring now to FIG. 2, a process flow of a method 200 for processing angiography data to identify semantic features of the coronary artery in accordance with an embodiment is illustrated. In exemplary embodiments, the angiography data for a coronary artery includes multiple runs of a coronary artery system of a patient, each from a different viewpoint. As illustrated at block 202, the method 200 includes separating the angiogram frames from each run and selecting a key frame from each run that shows the coronary artery. In exemplary embodiments, the key frame is the frame from a run that best illustrates the coronary artery. Next, as shown at block 204, the method 200 includes determining the viewpoint of each key frame and identifying the coronary artery being depicted in each key frame. The method 200 also includes creating an image by extracting a region of interest that contains the coronary arteries from each key frame, as shown at block 206. In exemplary embodiments, the region of interest can be extracted by exploiting the spatial and temporal variance in pixels of the key frame.

Continuing with reference to FIG. 2, as shown at block 208, the method 200 includes filtering the image to highlight the artery regions and separating the arteries from a background of the image to create threshold images. In exemplary embodiments, the coronary artery vessel structure can be highlighted by using any suitable ridge detection filter, such as a Radon-Like Features (RLF) filter. In exemplary embodiments, the intensity gradients in the filtered region are thresholded to separate the foreground vessel region from the background. Since a global threshold may be insufficient, the filtered coronary image is modeled as the output of a short-space stationary process. Since coronary arteries have small thickness (less than 16 pixels), an overlapping window analysis with a small window size W×W (W≤16), is sufficient. Within each window of size W×W, an optimal threshold T is determined, such that it separates the pixels within the regions into two classes with minimized intra-class variance $\sigma_w^2(T) = \omega_1(T)\sigma_1^2(T) + \omega_2(T)\sigma_2^2(T)$ where $\omega_1, \omega_2$ are the fractions of pixels belonging to the two classes.

Next, as shown at block 210, the method 200 includes processing (skeletonizing) the threshold image to create skeletal curve images of the arteries. In exemplary embodiment, the processing includes forming skeletal curves, $S_i = \{(x, y)\}$, by grouping connected components on interior pixels (non-junctions) of the skeletal image. As shown at block 212, the method 200 includes detecting one or more initial junction candidates from the skeletal curve images. Next, as shown at block 214, the method 200 includes creating junction images by removing spurious junctions from the initial junction candidates using junction clustering. In exemplary embodiments, spurious initial junctions are pixels with at least two incoming curves.

Continuing with reference to FIG. 2, as shown at block 216, the method 200 includes recovering tubular structures that form the artery bounding contours based on the skeletal curve images, the junction images, and the threshold images. In exemplary embodiments, extracting the tubular regions from the skeletal curves includes identifying boundary pixels on either side of the skeletal curve proceeding along surface normals at each skeletal point. The tubular boundary may have points out of order at turning points, particularly where there is ambiguity in surface normals. These out-of-order points are corrected by treating the chain of endpoints on either boundary as pairs of curves to be aligned using dynamic time warping. Each coronary artery segment $C_i$ is represented by an ordered set of skeletal points $\{(x, y, \delta_1, \delta_2, \theta)\}$ where $(x, y) \in S_i$ is a skeletal pixel on the skeletal curve $S_i$ passing through the tubular segment, and $\delta_1$, and $\delta_2$ are the units along the surface normal $\theta$ at which the tubular boundary points are detected.

The method 200 also includes extracting semantic features from the tubular structures, as shown at block 218. In exemplary embodiments, the semantic features include, but are not limited to, a number of significant junctions, a thickness of the arteries, a number of trifurcations, a tortuosity of the arteries, a length of artery segments, and lumen variations across arteries. In exemplary embodiments, the number of significant junctions $J_m$ provides an indication of the bushiness of arteries as diffuse arteries tend to have a larger number of junctions. The number of significant junctions is also referred to as semantic feature $f_1$.

In general, a blockage in the middle of the artery appears as a sudden change in the width of the artery. In exemplary embodiments, the average thickness of a coronary artery segment is given by $W_i = (\Sigma_i(\delta 2_i - \delta 1_i))/P$, where $\Sigma_i$ is over the skeletal points along each skeletal curve, and P is the number of points along each skeletal curve. The range of thickness variation within tubular regions, which provides an indication of stenosis, is given by $R_i = (\delta 21_i^{max} - \delta 21_i^{min})$. The distribution of thickness of arteries is referred to as semantic feature $f_2 = H(W_i)$ and $f_3 = H(R_i)$, where $H(W_i)$ and $H(R_i)$ are the histograms of the average thickness distribution and range respectively. The peaks in the histograms indicate the widths of dominant arteries and are useful in identifying the major coronary segments.

In exemplary embodiments, trifurcations may be useful in detecting cases in which the left main trifurcating coronary artery disease is present. Certain viewpoints (e.g. caudal) can cause trifurcation junctions to be detected which can also be a good indication for automatic viewpoint characterization. The number of trifurcations, referred to as sematic feature $f_4$ is computed as $f_4 = \{J_m, \text{degree}(J_m) > 3\}$.

In general, tortuosity is the number of curvature changes in the skeletal curves and the tortuosity can be measured using a histogram. Significant peaks in the histogram indicate the variation in tortuosity across the coronary artery segments. In one embodiment, an estimate of the curvature changes is determined by forming a line segment approximation of the skeletal curve by recursively partitioning it at points of maximum deviation. These points of deviation are places where there is significant change in curvature. The tortuosity is normalized by taking the ratio of the curvature change points $N_k$ over the total number of points $N_i$ to give $T_i = N_k/N_i$. By repeating this over all curves, a tortuosity feature vector is calculated as a histogram over $T_i$ as $f_5 = H(T_i)$.

In general, the length of artery segments is important to assess early bifurcation of the left main coronary artery. Since the skeletal curves are available, this semantic feature is computed by the pixel length of the skeletal curves and forming a histogram of it $f_6 = H(|S_i|)$, where $|S_i|$ is the length of skeletal curve $S_i$.

In exemplary embodiments, lumen variations are measured by sampling the intensity in the original image along surface normals to the skeletal curve and averaging it at each point along the skeletal curve. The range in intensity variations is similarly normalized by the maximum intensity in the region and its histogram is feature $f_7 = H(I_i)$, where $I_i$ is the normalized range of intensity variation in skeletal curve $S_i$.

In exemplary embodiments, the semantic features of each key frame of the angiogram are arranged into one long feature vector, $F_c$. In exemplary embodiments, Euclidean distance comparisons between feature vectors may not be sufficient to retrieve similar angiograms, both because of errors in vessel detection and the inherent variation in raw feature vectors. In exemplary embodiments, a Relevant Component Analysis (RCA) is used to identify similar angiograms based on their feature vectors $F_c$. In exemplary embodiments, RCA eliminates dimensions that are unlikely to be useful for classification using small subsets or chunklets of sample points. The chunklet covariance matrix is estimated as $$C = \frac{1}{N} \sum_i \sum_j (x_{ji} - m_j)(x_{ji} - m_j)^T$$

where $m_j$ denotes the mean of the j-th chunklet and $x_{ji}$ the i-th element of the j-th chunklet. A whitening transformation is then associated with the covariance matrix $CW=C^{-1/2}$ to apply to the data points after dimensionality reduction. In exemplary embodiments, a learning matrix is obtained by normalizing all of the feature vectors to be unit range using their maximum and minimum values. The features of a training set of coronary angiogram images from distinct viewpoints are annotated, such that those from the same viewpoint and similar coronary anatomies are annotated with the same label. Using the resulting learned metric W, the distance between any two coronary angiograms is given by the Mahalanobis distance $(X2-X1)^T W(X2-X1)$. This distance is finally used to rank coronary angiogram images in a database using their respective feature vectors.

Figure 3:
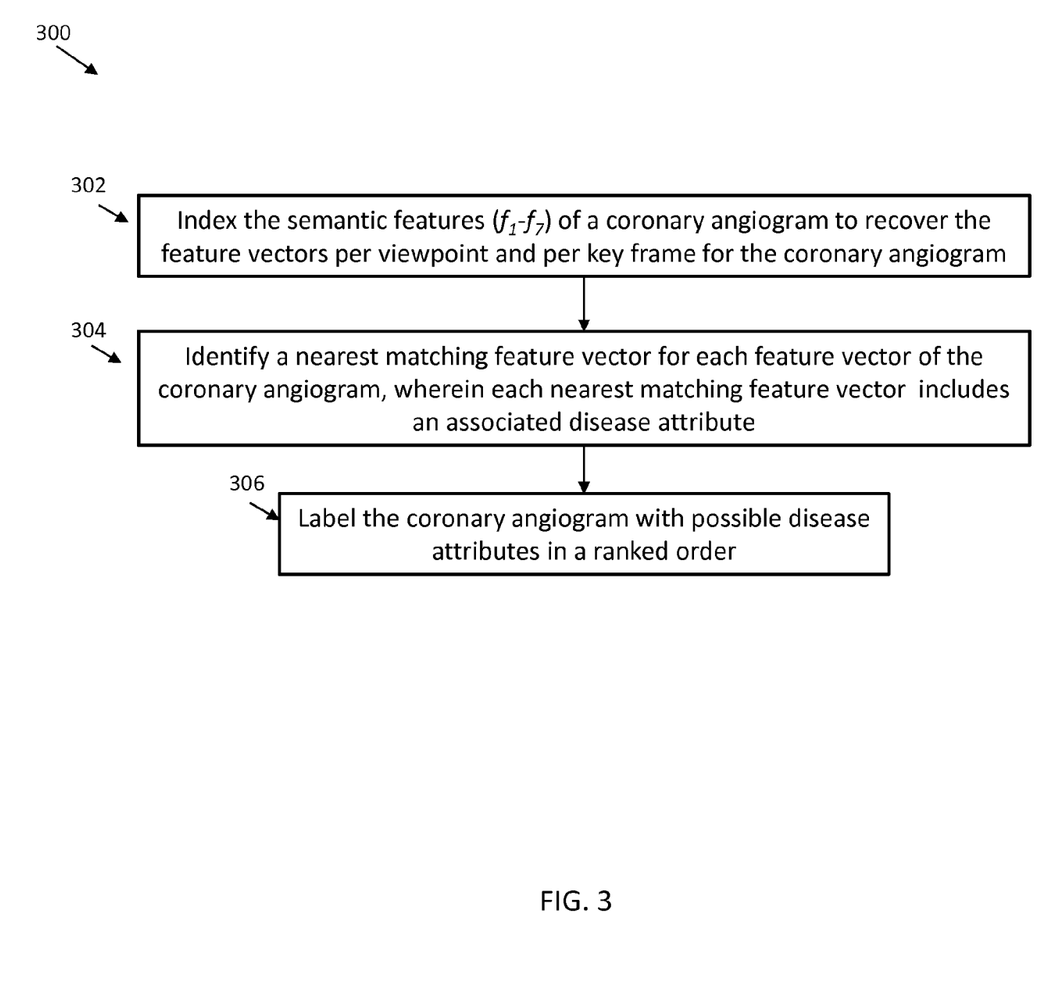
FIG. 3 depicts a process flow for identifying a nearest coronary angiogram of the coronary artery for each of the semantic features from a database of coronary angiograms in accordance with an embodiment.

Referring now to FIG. 3, a process flow of a method 300 for identifying a nearest coronary angiogram of the coronary artery for each of the semantic features from a database of coronary angiograms in accordance with an embodiment is illustrated. In exemplary embodiments, the database of coronary angiograms includes a plurality of coronary angiogram images ranked using their respective feature vectors. As shown at block 302, the method 300 indexing the semantic features ($f_1$-$f_7$) of a coronary angiogram to recover the feature vectors per viewpoint and per key frame for the coronary angiogram. Next, as shown at block 304, the method 300 includes identifying a nearest matching feature vector for each feature vector of the coronary angiogram. In exemplary embodiments, each nearest matching feature vector has an associated disease attribute, or diagnosis code. The method 300 also includes labeling the coronary angiogram with possible disease attributes in a ranked order, as shown at block 306. In exemplary embodiments, the labeling may include plotting a histogram of associated disease attributes in a ranked order.

Figure 4:
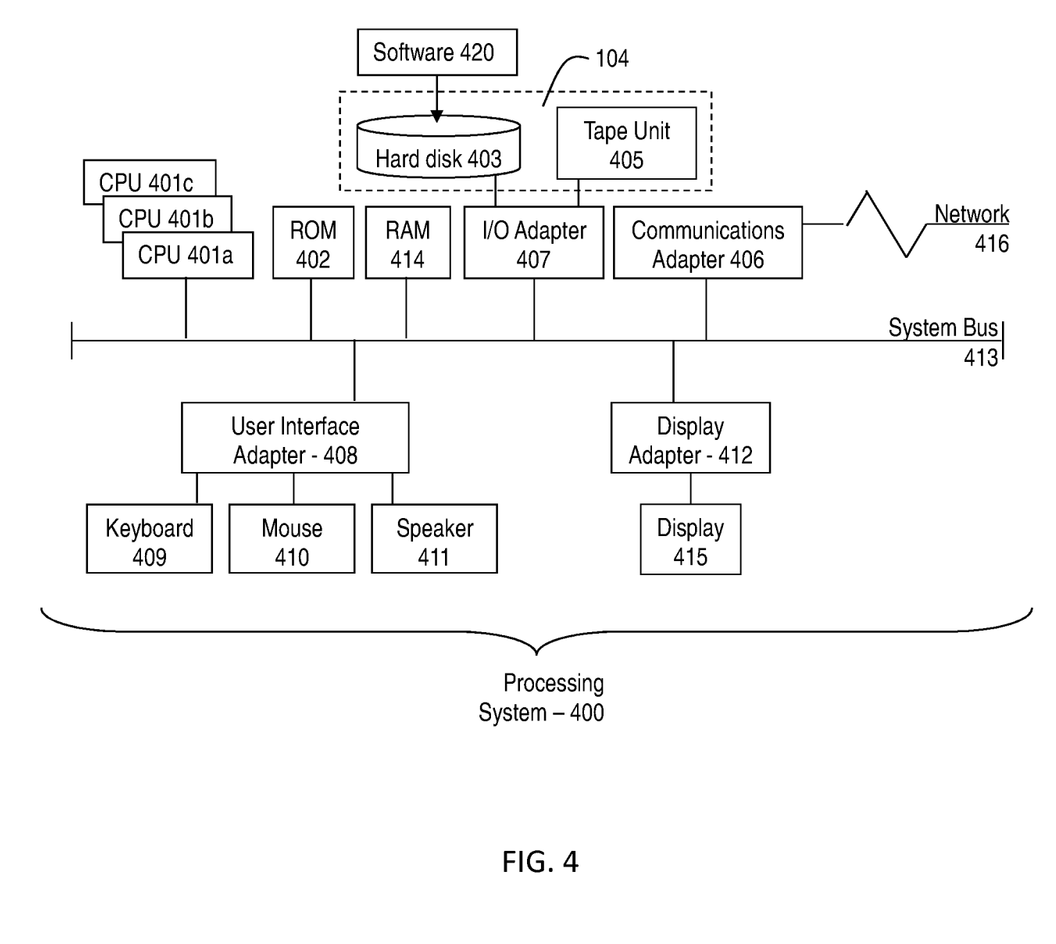
FIG. 4 depicts a processing system for practicing the teachings herein in accordance with an embodiment.

Referring to FIG. 4, there is shown an embodiment of a processing system 400 for implementing the teachings herein. In this embodiment, the system 400 has one or more central processing units (processors) 401a, 401b, 401c, etc. (collectively or generically referred to as processor(s) 401). In one embodiment, each processor 401 may include a reduced instruction set computer (RISC) microprocessor. Processors 401 are coupled to system memory 414 and various other components via a system bus 413. Read only memory (ROM) 402 is coupled to the system bus 413 and may include a basic input/output system (BIOS), which controls certain basic functions of system 400.

FIG. 4 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage device 405 are collectively referred to herein as mass storage 404. Software 420 for execution on the processing system 400 may be stored in mass storage 404. A network adapter 406 interconnects bus 413 with an outside network 416 enabling data processing system 400 to communicate with other such systems. A screen (e.g., a display monitor) 415 is connected to system bus 413 by display adaptor 412, which may include a graphics adapter to improve the performance of graphics intensive applications and a video controller. In one embodiment, adapters 407, 406, and 412 may be connected to one or more I/O busses that are connected to system bus 413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 413 via user interface adapter 408 and display adapter 412. A keyboard 409, mouse 140, and speaker 411 all interconnected to bus 413 via user interface adapter 408, which may include, for example, a Super I/O chip integrating multiple device adapters into a single integrated circuit.

Thus, as configured in FIG. 4, the system 400 includes processing capability in the form of processors 401, storage capability including system memory 414 and mass storage 404, input means such as keyboard 409 and mouse 140, and output capability including speaker 411 and display 415. In one embodiment, a portion of system memory 414 and mass storage 404 collectively store an operating system such as the AIX® operating system from IBM Corporation to coordinate the functions of the various components shown in FIG. 4.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for finding similar coronary angiograms in a database of coronary angiograms comprising:
   receiving, by a processor, angiography data for a coronary artery;
   processing, by the processor, the angiography data to identify one or more semantic features of the coronary artery, wherein the one or more semantic features comprise at least one of the following:
      a number of significant junctions in the coronary artery;
      a thickness of the coronary artery;
      a number of trifurcations in the coronary artery,
      a tortuosity of the coronary artery,
      a length of one or more segments of the coronary artery; and
      lumen variations across the coronary artery;
   identifying, by the processor, one or more nearest coronary angiograms for each of the one or more semantic features from the database of coronary angiograms; and
   receiving a disease attribute associated with each of the one or more nearest coronary angiograms.

2. The method of claim 1, further comprising generating a ranked list of possible disease attributes for the coronary artery based on the disease attribute associated with each of the one or more nearest coronary angiograms.

3. The method of claim 1, wherein the angiography data for the coronary artery includes a plurality of video sequences each depicting the coronary artery from different viewpoints.

4. The method of claim 1, wherein the one or more semantic features of the coronary artery are represented by a feature vector.

5. The method of claim 4, wherein identifying the one or more nearest coronary angiograms for each of the one or more semantic features from the database of coronary angiograms includes computing a distance fromz the feature vector of the coronary artery to a feature vector associated with each coronary angiogram in the database.

6. The method of claim 3, wherein processing the angiography data to identify one or more semantic features of the coronary artery comprises:
   separating angiogram frames from each of the plurality of video sequences and selecting a key frame from each of the plurality of video sequences that shows the coronary artery;
   determining a viewpoint of each key frame and identifying the coronary artery being depicted in each key frame;
   creating an image by extracting a region of interest that contains the coronary artery from each key frame;
   filtering the image to highlight an arterial region and separating the coronary artery from a background of the image to create a threshold image;
   processing the threshold image to create a skeletal curve image of the coronary artery;
   detecting one or more initial junction candidates from the skeletal curve images;
   creating junction images by removing spurious junctions from the initial junction candidates using junction clustering;
   recovering tubular structures that form the artery bounding contours based on the skeletal curve images, the junction images, and the threshold images; and
   extracting semantic features from the tubular structures.

7. A computer program product for finding similar coronary angiograms in a database of coronary angiograms, the computer program product comprising a computer readable storage medium having program code embodied therewith, the program code executable by a processor to:
   receive angiography data for a coronary artery;
   process the angiography data to identify one or more semantic features of the coronary artery, wherein the one or more semantic features comprise at least one of the following:
      a number of significant junctions in the coronary artery;
      a thickness of the coronary artery;
      a number of trifurcations in the coronary artery,
      a tortuosity of the coronary artery,
      a length of one or more segments of the coronary artery; and
      lumen variations across the coronary artery;
   identify one or more nearest coronary angiograms for each of the one or more semantic features from the database of coronary angiograms; and
   receive a disease attribute associated with each of the one or more nearest coronary angiograms.

8. The computer program product of claim 7, further comprising generating a ranked list of possible disease attributes for the coronary artery based on the disease attribute associated with each of the one or more nearest coronary angiograms.

9. The computer program product of claim 7, wherein the angiography data for the coronary artery includes a plurality of video sequences each depicting the coronary artery from different viewpoints.

10. The computer program product of claim 7, wherein the one or more semantic features of the coronary artery are represented by a feature vector.

11. The computer program product of claim 10, wherein identifying the one or more nearest coronary angiograms for each of the one or more semantic features from the database of coronary angiograms includes computing a distance from the feature vector of the coronary artery to a feature vector associated with each coronary angiogram in the database.

12. The computer program product of claim 9, wherein processing the angiography data to identify one or more semantic features of the coronary artery comprises:
   separating angiogram frames from each of the plurality of video sequences and selecting a key frame from each of the plurality of video sequences that shows the coronary artery;
   determining a viewpoint of each key frame and identifying the coronary artery being depicted in each key frame;
   creating an image by extracting a region of interest that contains the coronary artery from each key frame;
   filtering the image to highlight an arterial region and separating the coronary artery from a background of the image to create a threshold image;
   processing the threshold image to create a skeletal curve image of the coronary artery;
   detecting one or more initial junction candidates from the skeletal curve images;
   creating junction images by removing spurious junctions from the initial junction candidates using junction clustering;
   recovering tubular structures that form the artery bounding contours based on the skeletal curve images, the junction images, and the threshold images; and
   extracting semantic features from the tubular structures.

13. A system for finding similar coronary angiograms in a database of coronary angiograms comprising:
   a memory having computer readable computer instructions; and
   a processor for executing the computer readable instructions, the instruction including:
   receiving angiography data for a coronary artery;
   processing the angiography data to identify one or more semantic features of the coronary artery, wherein the one or more semantic features comprise at least one of the following;
      a number of significant junctions in the coronary artery;
      a thickness of the coronary artery;
      a number of trifurcations in the coronary artery,
      a tortuosity of the coronary artery,
      a length of one or more segments of the coronary artery; and
      lumen variations across the coronary artery;
   identifying one or more nearest coronary angiograms for each of the one or more semantic features from the database of coronary angiograms; and
   receiving a disease attribute associated with each of the one or more nearest coronary angiograms.

14. The system of claim 13, further comprising generating a ranked list of possible disease attributes for the coronary artery based on the disease attribute associated with each of the one or more nearest coronary angiograms.

15. The system of claim 13, wherein the angiography data for the coronary artery includes a plurality of video sequences each depicting the coronary artery from different viewpoints.

16. The system of claim 13, wherein the one or more semantic features of the coronary artery are represented by a feature vector.

17. The system of claim 16, wherein identifying the one or more nearest coronary angiograms for each of the one or more semantic features from the database of coronary angiograms includes computing a distance from the feature vector of the coronary artery to a feature vector associated with each coronary angiogram in the database.

* * * * *